United States Patent

Borja et al.

[11] 4,318,208
[45] Mar. 9, 1982

[54] FASTENING SYSTEM

[75] Inventors: Jesus Borja, Glenview; John A. Bakker, Bartlett, both of Ill.; Edward C. French, Fullerton, Calif.

[73] Assignee: Illinois Tool Works Inc., Chicago, Ill.

[21] Appl. No.: 79,754

[22] Filed: Oct. 5, 1979

[51] Int. Cl.³ .............................................. F16B 13/00
[52] U.S. Cl. ...................................... 24/305; 24/214; 411/508; 411/511
[58] Field of Search ............... 24/73 P, 73 PF, 73 PP, 24/73 S, 213 R, 213 CS, 214, 208 A, 305; 85/5 R, 80; 411/508, 509, 510

[56] References Cited

U.S. PATENT DOCUMENTS

| 665,901 | 1/1901 | Hampton | 85/5 R |
|---|---|---|---|
| 1,817,775 | 8/1931 | Sipe | 85/5 R X |
| 2,926,409 | 3/1960 | Perry | 85/5 R |
| 3,093,874 | 6/1963 | Rapata | 85/5 R X |
| 3,169,292 | 2/1965 | Fenton | 24/213 R |
| 3,736,834 | 6/1973 | MacDonald | 85/80 X |
| 3,810,279 | 5/1974 | Swick | 24/73 P |
| 3,852,849 | 12/1974 | Pestka | 24/73 P |

FOREIGN PATENT DOCUMENTS

| 981428 | 1/1976 | Canada | 85/5 R |
|---|---|---|---|
| 676355 | 11/1964 | Italy | 24/73 P |
| 1276846 | 6/1972 | United Kingdom | 24/213 R |

*Primary Examiner*—Thomas J. Holko
*Attorney, Agent, or Firm*—Jerold M. Forsberg; Thomas W. Buckman; Jack R. Halvorsen

[57] ABSTRACT

A fastening system including two plastic fasteners for removably securing two workpieces together, including a female socket accepted and retained within a bore in one workpiece and a double ended male stud self-retained in a bore in the second workpiece and removably accepted in complimental fashion in the female socket. One end of said male stud carrying a deflectable spherically shaped segmented head which permits limited tolerance variation between center lines positions of making bores in the two workpieces.

8 Claims, 4 Drawing Figures

U.S. Patent  Mar. 9, 1982  4,318,208

FASTENING SYSTEM

BACKGROUND OF THE INVENTION

With the rapid rise of recording equipment and stero, the components have become more sophisticated. Particularly in the area of speakers it is now possible to individually adjust speakers but access must be provided to the components which are mounted generally co-planar with the speakers per se. This has resulted in the necessity of gaining access of to the components and the speakers from the front side of the speaker cabinet. In many instances the back of the speaker cabinet is sealed for sound purposes. Much earlier in time, speakers were mounted on the front of the cabinet by using a screw such as shown in U.S. Pat. No. 3,124,031 assigned to the common assignee of the present invention. Such screws were installed prior to the installation of the cloth or other material forming the decorative cover on the front of the speaker and the speaker was mounted over the screw and secured by a nut from the rear side. In many instances, this provided a major task in gaining access should the nuts securing the speakers in place be loosened due to the vibration of the speaker per se.

SUMMARY OF THE INVENTION

The present invention relates to a novel fastening system including two plastic fasteners one of which is a female socket accepted and retained within a bore in one workpiece and a double ended male stud self-retained in a bore in the second workpiece. The parts can be used either in the grille covering the speaker with the second fastening means being utilized in the main body or box within which the speakers are mounted. An object of the present invention is to provide a economical pair of fasteners which can be readily installed in co-axial bores of two workpieces to hold the workpieces in juxtaposed relationship.

A further object of the present invention is to provide a fastening system which will absorb the vibrations normally inherent in a speaker cabinet and grille without experiencing release of the fastening system nor production of unwanted vibratory noices.

An additional object of the present invention is to provide an economical fastener which can be repeatedly used without reduction in holding capacity.

Still another object of the present invention is to provide a fastener which is capable of accepting limited tolerance variations between center line positions of the mating bores in the two workpieces.

Other objects will be apparent to those skilled in the art when the detailed specification is read in conjunction with the drawings.

DETAILED DESCRIPTION

Figure 1:
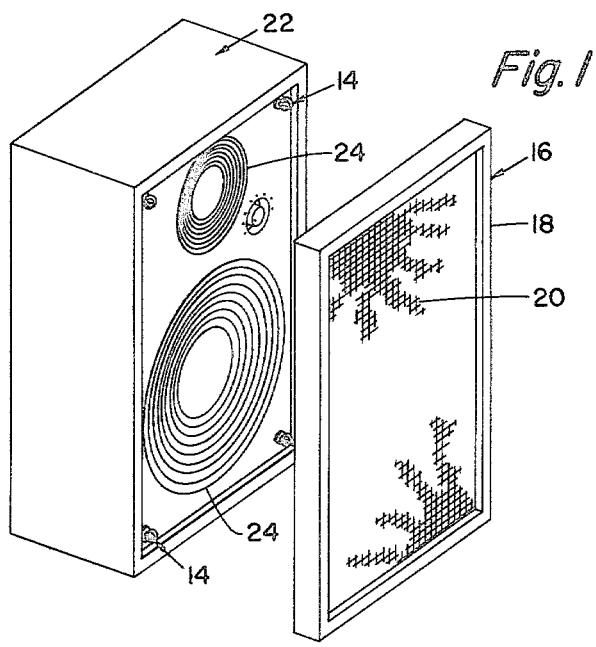
FIG. 1 is a perspective expanded view in stylized form of a speaker cabinet and grille showing at least one environment in which the present invention can be utilized.

Referring now to the drawing in which similar numerals are utilized to designate similar parts, the fastening system 10 of the present invention includes a female socket member 12 and a double ended male stud 14. One environment in which the system can be utilized is for the fastening of a decorative grille 16 having a perimetral frame 18 within which a decorative material 20 is stretched. The grille 16 is mounted on and fastened to the front of a cabinet 22 carrying one or more speakers 24 and having a plurality of the components of the system mounted thereon to accept and retain the second member of the system mounted on the backside, and therefore not visable in FIG. 1, of the grille 16. In the present instance, there are four of the double ended male studs 14 shown mounted in the speaker cabinet for acceptance within a like number of female sockets 12, not shown, on the backside of the grille 16. The female socket 12 includes a head 30, an annular body 32 having a plurality of axially spaced ribs 34 which each present a chamfered underside and an abrupt shoulder facing the flanged head 30 and at the opposite or lower extremity is a closed end 36. Thus the socket 12 is basically an open ended cup like member having a bore 38 which includes an annular rib 40 of a predetermined diameter extending inwardly into the bore 38 for purposes best set forth hereinafter. The annular rib 40 is disposed generally adjacent the open mouth of bore 38.

The double ended stud 14 includes a first substantially rigid portion 50 that has an external polygonal configuration with a plurality of deflectable wing like elements 52 and attached in axially spaced relation to a generally flat surface 54 to provide ease in ending along a straight line for each of the wing elements 52. A stud of this configuration is generally shown in U.S. Pat. No. 3,810,279 assigned to the common assignee of the present invention. Such a device can be used in thin panels or in blind bores and provides a secure fastening means.

Intermediate the extremities of male stud 14 is a radially extending flange or head 56 which serves to limit the degree of axial insertion into a workpiece. While a thin head is shown, it will be recognized by those skilled in the art that a spacer type head of a much greater axial extent can be utilized.

Figure 2:
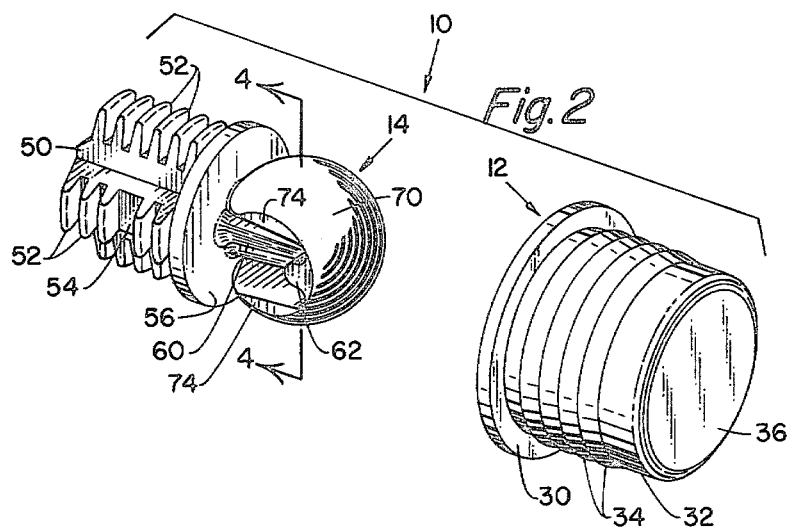
FIG. 2 is an exploded perspective view of a preferred embodiment of the present invention.
Figure 3:
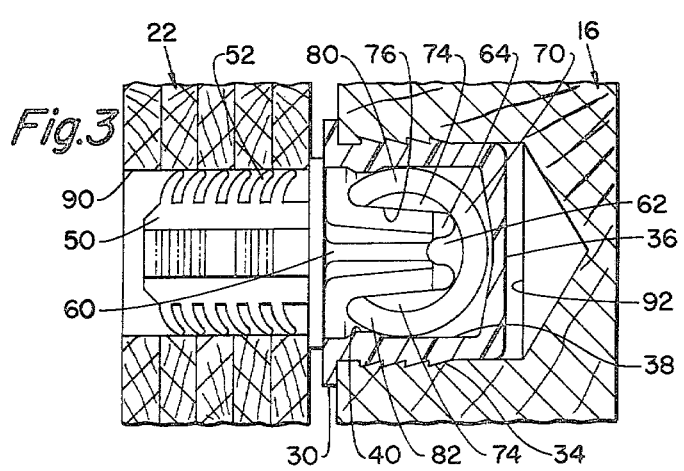
FIG. 3 is a side-elevational view in partial section showing the preferred embodiment of the present invention in installed relation of the two workpieces.
Figure 4:
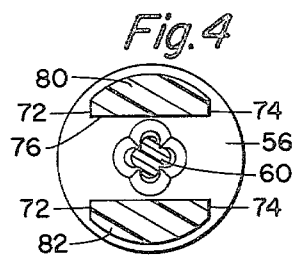
FIG. 4 is a cross sectional view taken along line 4—4 of FIG. 2.

A second portion of the double ended stud extends in the opposite direction from head 56 co-axial with the first portion 50. The second portion includes a central semi-rigid column 60 that is tapered from its connection to the head 56 to its opposite extremity. In the present embodiment, the column 60 is cruciform in configuration and terminates in a pair of normally disposed rod like members 62 and 64, as best seen in FIGS. 2 and 3. These two elements 62 and 64 support a spherically surfaced head member 70. The member 70 is chordally relieved on two opposite sides to form the flat surfaces 72 and 74 and is further relieved by a transverse slot 76 adapted to accept and accomodate the cruciform column 60 along with its supporting elements 62 and 64. The head portion 70, therefore, is defined by a curvilinear nose and a pair of depending arms 80 and 82 which are capable of deflection towards one another. Additionally the tapered column 60 is deflectable in substantially all directions as in precession along its axis with the supporting elements 62 and 64 insuring that the head 70 to be in an oriented relationship relative to the axis of the fastener 14. The head 70 with its dependent arms 80 and 82 has a curvilinear surface that is greater in extent than 180° and a diameter that is substantially equal to the diameter of bore 38 but greater than the predetermined diameter of the annular ring or shoulder 40.

In the operation of the present device, the first portion 50 of the male stud 14 is inserted into a bore 90 that is slightly smaller in diameter than the diametrical extent of the wings 52. As can best be seen in FIG. 3, the insertion of the rigid stud 50 with its wings 52 into the bore 90 of speaker cabinet 22 results in a deflection of the wings 52 and a secure fastening in cabinet 52. The female element is introduced into a complementary bore 92 in the frame of grille 16 with the shouldered annular rings 34 digging into the fiberous material from which the grille 16 is fabricated. Since the bores 90 and 92 are in general alignment, the head 70 will be readily accepted within the socket for female member 12 with the legs 80 and 82 being deflected inwardly during insertion to override the annular ring 40 and to engage on the inner or backside thereof. Repeated removals and re-engagement are possible along with the capability, previously mentioned, of the male fastener deflecting laterally to accept minor tolerance variations in the alignment of the bores 90 and 92. Both parts of this fastening system can be fabricated by injection molding of thermoplastic materials such as nylon, acetal or any other known thermoplastic material providing the necessary qualities of lubricity and structural strength.

Thus, the present invention has shown a novel fastening system of a double ended self-aligning male stud acceptable within a female socket which can be economically produced and inserted with a minimum of labor in the two workpieces which are to be held in juxtaposed position. It will be appreciated, of course, that the head 56 of the male stud 14 and the head 30 of the female socket 12 can be recessed into counterbores, not shown, of the two workpieces 22 and 16 respectively. Similarly, it will be appreciated that the socket can be placed in the speaker cabinet and the double ended male stud 14 in the grille frame. Assembly of this type would be a matter of choice of the user. What is claimed is:

1. A plastic two piece fastener for maintaining two workpieces in movable juxtaposed relationship wherein each of the workpieces has a bore which may be proximate to yet misaligned with a similar bore in the other workpiece, said fastener system including a female socket adapted to be accepted in the bore in one workpiece and a double ended self-mounting male stud having a first portion adapted to be accepted in the aligned bore of the other workpiece and a second portion projecting outwardly therefrom adapted to be complementarily accepted within said female socket, said female socket having external means impinging on the wall of said bore to retain said female socket within said bore, means projecting radially inwardly of said socket to engage said second portion, said first portion of said male stud including a substantially rigid axially extending first element having laterally projecting resilient means adapted to permit ready introduction into a bore and positive retention against inadvertent withdrawal, a laterally extending flange means between said first and second portions serving generally as a head member to limit the depth of introduction of said first portion into a bore, said second portion including a coaxial means extending in the opposite direction from said first portion, said coaxial means being deflectable substantially as in precession at its end opposite said flange means and said coaxial means further having means including a curvilinear exterior surface extending outwardly from the end of said coaxial means substantially in all directions and further having at least two laterally reversley directed curvilinear means extending toward said flange means, said deflectable coaxial means of said second portion including a tapered stem generally decreasing in thickness due to a general reduction in cross sectional area as it extends away from the flange means toward said deflectable head, said curvilinear means forming a deflectable head acceptable in complementary relation within said female socket, whereby said deflectable head and said tapered stem are laterally movable as in precession and adapted to accommodate centerline tolerance variations between said two workpieces.

2. A fastener of the type claimed in claim 1 wherein said tapered stem is generally cruciform in cross-section.

3. A fastener of the type claimed in claim 2 wherein said curvilinear surface on said deflectable head is substantially spherical in nature.

4. A fastener of the type claimed in claim 3 wherein said spherically shaped deflectable head is generally in the form of a sphere which has opposite sides chordally removed by a pair of spaced parallel planes and cored out between said planes to accept said tapered stem within said head thereby providing a curved end nose portion and two depending deflectable side portions presenting a segmented spherical surface in excess of 180° in extent.

5. A fastener of the type claimed in claim 4 wherein said stem is cruciform in cross-section and is joined with said deflectable head by a pair of cruciform disposed ribs falling generally in a plane perpendicular to the axis of said stem, and located at the root of said cored out portion adjacent said nose portion.

6. A fastener of the type claimed in claim 5 wherein the cruciform shape of said stem and said ribs are coincident.

7. A fastener of the type claimed in claim 3 wherein said female socket inwardly projecting means is an annular rib having a predetermined diameter, said spherical head having a diametral extent greater than said predetermined diameter, thereby causing said reversely bent portions to flex towards said coaxial means.

8. A fastener of the type claimed in claim 7 wherein said first portion substantially rigid element is polygonal in shape and presents at least three axially extending flat faces, at least one radially extending flexible means on each such face and having a combined diametral extent greater than the bore with which they are to be associated whereby said last mentioned means deflect along a straight line when introduced into said bore and bite into the wall of said bore and prevent withdrawal.

* * * * *